United States Patent
Brothers et al.

(10) Patent No.: US 7,881,530 B2
(45) Date of Patent: Feb. 1, 2011

(54) ADJUSTING COLORANTS SPECIFIED IN A DIGITAL IMAGE

(75) Inventors: Kent M. Brothers, Vancouver (CA); Jeffrey C. Brewster, North Vancouver (CA)

(73) Assignee: Eastman Kodak Company, Rochester, NY (US)

(*) Notice: Subject to any disclaimer, the term of this patent is extended or adjusted under 35 U.S.C. 154(b) by 913 days.

(21) Appl. No.: 11/695,170

(22) Filed: Apr. 2, 2007

(65) Prior Publication Data

US 2008/0239418 A1 Oct. 2, 2008

(51) Int. Cl.
G06K 9/00 (2006.01)
(52) U.S. Cl. .................................. 382/167; 382/162
(58) Field of Classification Search ................ 382/162, 382/165, 167; 358/518, 525
See application file for complete search history.

(56) References Cited

U.S. PATENT DOCUMENTS

| | | | |
|---|---|---|---|
| 5,786,908 A | 7/1998 | Liang | |
| 2004/0090640 A1 | 5/2004 | Nino et al. | |
| 2004/0201696 A1 | 10/2004 | Yoda | |
| 2006/0197966 A1 | 9/2006 | Viturro et al. | |
| 2007/0146744 A1 | 6/2007 | Kang et al. | |

FOREIGN PATENT DOCUMENTS

| | | |
|---|---|---|
| EP | 758 181 | 2/1997 |
| EP | 1 341 370 | 9/2003 |
| EP | 1 190 562 | 4/2004 |
| EP | 915 615 | 7/2005 |
| WO | WO 93/20648 | 10/1993 |
| WO | WO 2005/006730 | 1/2005 |

*Primary Examiner*—Duy M Dang
(74) *Attorney, Agent, or Firm*—Nelson Adrian Blish

(57) ABSTRACT

A method for making a device link (90) for a color management system, with an associated imaging apparatus (20), wherein the device link specifies a transformation of digital-image colorant combinations to imaging-apparatus colorant combinations. The device link converts the digital image (70) to a modified digital image (100) represented using the imaging-apparatus colorant combinations, thereby allowing the imaging apparatus to produce an output image (170) having output-image colors matching reference-image colors at corresponding physical locations in a reference image (80). The method includes establishing an association between selected digital-image colorant combinations and reference-image colors, determining for each associated measured reference-image color a suitable imaging-apparatus colorant combination that will produce the reference-image color when rendered by the imaging apparatus, extending the transformation to all other digital-image colorant combinations by means of a mathematical interpolation, and encoding and encapsulating the transformation in a digital form as a device link.

16 Claims, 3 Drawing Sheets

ADJUSTING COLORANTS SPECIFIED IN A DIGITAL IMAGE

FIELD OF THE INVENTION

This invention relates to image proofing methods and apparatus; more particularly to device links for color management systems.

BACKGROUND OF THE INVENTION

In the printing industry, it is common practice for a customer to provide a digital image to a printer, who then provides a sample printed version of that image to the customer for approval prior to printing a large number of copies of the image using a high volume output device such as a printing press. The sample printed version is known as a "proof" and it is used to ensure that the customer is satisfied with the contents, composition and color gamut and tone characteristics of the image.

It is not cost effective to print the proof using a high volume output device since it is expensive to set up. Accordingly, it has become the practice in the printing industry to use digital color printers to print proofs. The digital color printer is configured so that the printed version of an image is close in color to what one would obtain on the high volume output device, and this printed image is typically presented to the customer for approval before the digital image is printed on the high volume output device.

In some situations, the customer may provide to the printer not only the digital image of an image to be printed in volume, but also a reference image, with a demand that the printer should match their proof and printed copies of the image to the reference image. This creates a considerable problem, since the printer has to now render printed images from the digital image in such a way that the printed images match the customer-provided reference image. Printers typically do not have transformation information that would allow printing equipment to match the customer reference image. In some cases, the customer-provided reference image may be similar to the proof that the printer makes. Consequently, there may be enough latitude in the configuration of the high volume output device to allow the device to be adjusted to match the customer-provided reference image. In other cases, the customer-provided reference image may not be within the range of adjustment of the high volume output device. In yet other cases, it may be that multiple images need to be printed simultaneously on a single "flat" on the high volume output device, and the adjustments necessary to make the output from the high volume output device match the customer-provided reference image would cause other images on the flat to not match their corresponding printer-generated proof or customer-provided reference image.

One approach to this problem has been to use tonal adjustments on each ink separately, as is typically done to address the problem of dot gain. In general, however, this requires that such gain be applied to individual images rather than an entire flat of images that will be printed simultaneously, and not all digital printing workflow software allows such image-specific adjustments. In practice, the necessary tonal adjustments are usually estimated subjectively rather than from measurements, with the consequence that if the adjustment does not provide an adequate color match then the adjustments must themselves be adjusted. The resulting iterative process is therefore costly and time-consuming. Furthermore, it is often the case that a good color match cannot be achieved by adjusting individual inks separately.

A more typical approach to addressing this problem is for the printer first to generate his own proof on his own proof printer, compare to the customer-provided reference image, and adjust the digital image manually, using image manipulation software such as Adobe Photoshop, and repeat this process until the proof matches the customer-provided reference image. Since his volume printers will color-match his proof-printer, he knows that if his proof color-matches the reference image, his volume printers will print images that are color-matched to the reference image. Since the reference image may in fact have colors that differ significantly from the intended standard, such as SWOP, or from the colors that the printer's proof printer produces for the image, this iterative process also often turns out to be costly and time-consuming.

There is therefore a need for an automated method by which a digital image provided by a customer to a printer may be modified by the printer, based on a supplied reference image produced from the same digital image, so that the modified digital image, when printed by the printer's high volume output device, will color-match the customer-provided reference image.

SUMMARY OF THE INVENTION

The present invention includes an apparatus and method for making a source profile or device link for a color management system from an arbitrary digital image and a reference image that is a rendering of the digital image. The color management system uses the source profile or device link to convert the digital image to a modified digital image represented using imaging-apparatus colorant combinations pertaining to an imaging apparatus, thereby allowing the imaging apparatus to image the modified digital image to produce an output image having output-image colors matching the colors at corresponding physical locations in the reference image. To create the device link, the method uses color information contained in only the digital image, a destination profile of an imaging apparatus and the reference image. To create the source profile, the method uses color information contained in only the digital image and the reference image. The several methods and apparatus of the invention find application in situations where a source profile for the imaging device that generated the reference image is not known.

In one aspect of the present invention, a method for making the source profile includes establishing an association between selected digital-image colorant combinations and reference-image colors obtained at selected spatial locations in the reference image by a color-measurement device, extending the association so achieved to a transformation defined for all digital-image colorant combinations by means of a mathematical interpolation, and encoding and encapsulating the transformation in a digital form as a source profile for use by the color management system.

In a second aspect of the present invention, a method for making the device link includes establishing an association between selected digital-image colorant combinations and reference-image colors obtained at selected spatial locations in the reference image by a color-measurement device, determining for each associated measured reference-image color a suitable imaging-apparatus colorant combination that will produce reference-image color when that suitable imaging-apparatus colorant combination is rendered by the imaging apparatus, extending the association so achieved to a transformation defined for all digital-image colorant combinations by means of a mathematical interpolation, and encoding and encapsulating the transformation in a digital form as a device link for use by the color management system.

The digital image colorant combinations in the digital image are analyzed by location over the entire digital image to determine selected spatial locations at which the digital-image colorant combinations, suitably weighted to approximate the inherent integrative weighting by the color-measurement device of the locations within its measurement area or spot on the reference image, vary least about one or a small plurality of distinctly different digital-image colorant combinations over an area comparable to the measurement area of the color-measurement device.

At each selected spatial location on the image, a representative colorant combination, or a small plurality of representative colorant combinations, is calculated from the digital-image colorant combinations that obtain in the vicinity of that selected spatial location, with each digital-image colorant combination suitably weighted to emulate the inherent integrative weighting by the color-measurement device of the locations within its measurement area or spot on the reference image. For each selected spatial location with more than one representative colorant combination, a system of equations obtains that is solved to yield a reference-image color for each representative colorant combination.

In the calculation of a device link, the reference-image color measured at each of the selected spatial locations is then used, along with the destination profile of the imaging apparatus and the known digital-image colorant combinations at those selected spatial locations, to determine an imaging-apparatus colorant combination that will produce the reference-image color when that imaging-apparatus colorant combination is rendered by the imaging apparatus.

By suitable mathematical interpolation, the association of representative colorant combinations with reference-image colors in the case of calculating a source profile, or with imaging-apparatus colorant combinations in the case of calculating a device link, is then extended to all digital-image colorant combinations.

In the final step of the present invention, the transformation is encoded as a source profile or device link in such format as may be required by the color management system.

In a further aspect of the present invention, a device-link generating apparatus, capable of executing the method of the present invention includes a measurement-location selector, a device-link transform generator and a color-measurement apparatus, the color-measurement apparatus comprising a color-measurement device and a reference-image alignment system. The color-measurement device is capable of measuring colors at selected spatial locations in a reference image, the reference image and a digital image both representing the same image, the digital image and the reference image being aligned to each other by the reference-image alignment system. Using the device link of the present invention, a color management system is capable of converting the digital image to a modified digital image, wherein the modified digital image is represented using imaging-apparatus colorant combinations pertaining to an imaging apparatus. The imaging apparatus is thereby capable of rendering a digital image as an output image having output-image colors matching reference-image colors at corresponding physical locations in the reference image.

In a further aspect of the present invention, a source-profile generating apparatus, capable of executing the method of the present invention includes a measurement-location selector, a source-profile transform generator and a color-measurement apparatus, the color-measurement apparatus comprising a color-measurement device and a reference-image alignment system. The color-measurement device is capable of measuring colors at selected spatial locations in a reference image, the reference image and a digital image both representing the same image, the digital image and the reference image being aligned to each other by the reference-image alignment system. Using the source profile of the present invention and the destination profile of an imaging apparatus, a color management system is capable of converting the digital image to a modified digital image, wherein the modified digital image is represented using imaging-apparatus colorant combinations pertaining to an imaging apparatus. The imaging apparatus is thereby capable of rendering a digital image as an output image having output-image colors matching reference-image colors at corresponding physical locations in the reference image.

DETAILED DESCRIPTION OF THE INVENTION

Figure 1:
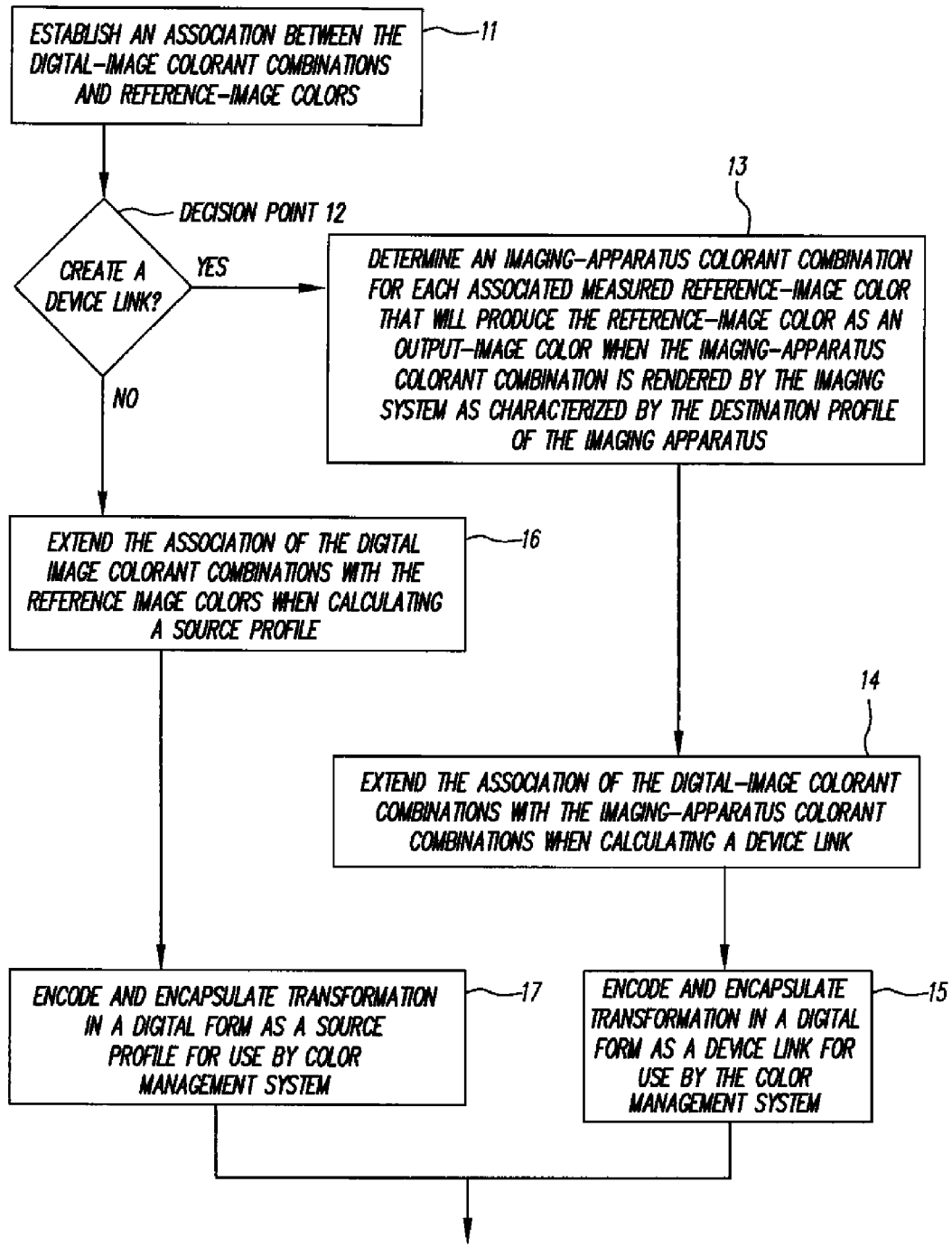
FIG. 1 is a flow chart for creating a device link according to the present invention.

A "digital image" is a computer-readable specification of a function that identifies, for each spatial location in a given subset of 2-dimensional Euclidean space, a combination of different amounts of "colorants," such as, but not limited to, the red, green, blue (RGB) element intensities of a monitor display or the cyan, magenta, yellow, and black (CMYK) densities of inks of a printing apparatus. We refer to this combination as a "colorant combination." In the following description, a 2-dimensional space is used to describe the present invention. The present invention may also be extended to higher-dimensional "images."

A "reference image" is a rendering of the digital image on a medium using an imaging apparatus. The reference image is in a format that allows the measurement of colors in the reference image with the color-measurement apparatus.

The "color" at a location in an image refers to a measurement of the frequency distribution of light reflectance or emission at that location, such as but not limited to, the spectral reflectance distribution of a small area about the location such as are measured by a spectrophotometer, or a tristimulus measure of color such as the standard CIEXYZ or CIELab measures.

A "color-measurement apparatus" includes a "color-measurement device" and a "reference-image alignment system." A color-measurement device is any apparatus that is configured to measure the color at any given location in a rendered image that is printed on a substrate such as, but not limited to, paper or Mylar, or displayed on a display device such as, but not limited to, a viewing screen. The rendered image can be a reference image, which can be provided by a client.

Throughout the present specification, the terms "measurement-location selector," "source-profile transform generator" and "device-link transform generator" are used to describe by their function any suitably programmed computing device or other similar controlling device.

An "imaging apparatus" is an apparatus that is configured to render a digital image and can include an imaging device and an imaging controller to control the imaging device. The imaging controller can render an output image on the imaging device. The imaging controller can be a suitable computer or other controlling device.

The invention is directed towards a method for modifying a digital image such that, when the modified digital image is rendered on an imaging apparatus as an "output image," the colors of the reference image and the output image at corresponding locations are measurably or visually similar.

In one aspect, the present invention includes a method for making a source profile or a device link for a color management system. The term "source profile" is used to describe a transformation of a spatial distribution of digital-image colorant combinations to reference-image colors. The term "destination profile" is used to describe a transformation of a spatial distribution of imaging-apparatus colorant combinations to output-image colors, and the term "device link" is used to describe a transformation of digital-image colorant combinations to imaging-apparatus colorant combinations. The color management system uses the source profile or device link to convert the digital image to a modified digital image represented using the imaging-apparatus colorant combinations allowing the imaging apparatus to image the modified digital image in order to produce an output image having output-image colors matching reference-image colors at corresponding physical locations in a reference image.

The color associated with a particular colorant combination is typically obtained by imaging a small area that is uniformly covered with pixels of that colorant combination and measuring the resulting color. That is, the same colorant combination is used at every location of the area measured. However, even if the colors resulting from all possible combinations of colorants were known, this alone does not allow prediction of the color that would result from a spatial distribution of colorant combinations, in part because of the effects of light scatter by the different inks and media, and ink bloom. In most, if not all, color management systems in use at present, a profile is a transformation only of colorant combinations to colors, or the reverse, and in particular does not have a spatial distribution of colorant combinations as input to the transformation. Here, the term "profile" is extended to the definitions above that take a spatial distribution of potentially different colorant combinations as input to the transformation.

The optimal device link for matching a reference image would be a transformation such that, if the color at each location of the digital image were transformed according to this transformation and the resulting modified digital image rendered on the imaging apparatus to an output image, then some overall measure of the differences between the colors of the reference image and the colors of the output image (such as the maximum of such error) would be minimized. Assume for the moment that the colors of the reference image had been measured over a dense set of locations in the image, thereby allowing computation of an overall measure of differences for any given output image. One approach to finding an optimal device link would be via exhaustive enumeration, that is, for each device link as could be represented in a particular form, the summary measure, or a prediction of it based on the destination profile of the imaging apparatus, is computed, and the device link that gave the smallest summary measure then selected. However, if there were 4 colorants (e.g. CMYK) in both the digital image and the output image, the level of each colorant were represented using 8 digital bits, and the device link were represented with a multi-way table with 17 "grid" points per component, then there would be $17^4$=83,521 table entries, and $256^4$=4,294,967,296 possible output-image colorant combinations for each entry, so the number of possible device links of this form would be $4,294,967,296^{83,521}$ or about $10^{804,554}$. Clearly such an evaluation would be impossible using any computer hardware in the foreseeable future. What is desired, then, is a method by which to determine a device link close to this optimal device link, but with far less computation.

Referring to FIG. 1, the first step (step 11) in the method of the present invention, referred to here as the "reference-image color association step," applicable both to the creation of a device link and to the creation of a source profile, is that of establishing an association between selected digital-image colorant combinations and reference-image colors.

In the case where a device link is being created 12, a further step (step 13), referred to here as the "output-image color association step," determines, for each associated measured reference-image color, a suitable imaging-apparatus colorant combination that will produce said reference-image color as an output-image color when that suitable imaging-apparatus colorant combination is rendered by the imaging apparatus, as characterized by the destination profile of the imaging apparatus. The destination profile is the known relationship between imaging-apparatus colorant combinations and the output-image colors produced when those imaging-apparatus colorant combinations are rendered by the imaging apparatus.

In the case of the creation of a device link, the previous two steps, in combination, establish an association between the selected digital-image colorant combinations and the imaging-apparatus colorant combinations.

The next step, collectively referred to here as the "extension step," is to extend the association of digital-image colorant combinations with reference-image colors in the case of calculating a source profile 16, or the association of digital-image colorant combinations with imaging-apparatus colorant combinations in the case of calculating a device link 14, to a transformation defined for all digital-image colorant combinations using a suitable mathematical interpolation method or mathematical modeling method.

Finally, in a step referred to here as the "encapsulation step," the transformation is encoded and encapsulated in a digital form as a source profile 17 or device link 15 for use by the color management system. The result of the method of the invention, is that a source profile is generated starting with only the digital image and a reference image as inputs, the source profile allowing a color management system to modify the image so that when the modified digital image is rendered by an imaging apparatus as an output image having output-image colors, the output-image colors matching reference-image colors at corresponding physical locations in the reference image. Similarly, the invention allows a device link to be generated starting with only the digital image, a reference image and the destination profile of a destination imaging apparatus as inputs, the device link allowing a color management system to modify the image so that when the modified digital image is rendered by an imaging apparatus as an output image having output-image colors, the output-image colors matching reference-image colors at corresponding physical locations in the reference image.

These individual steps will now be described in more detail at the hand of several embodiments of the present invention.

In a first embodiment of the present invention, the reference-image color association step of the method proceeds by selecting one or more selected spatial locations in the digital image, calculating for each of the one or more selected spatial locations a representative colorant combination and obtaining the reference-image colors at the corresponding spatial locations in the reference image. The transformation is derived from the representative colorant combinations and the corresponding reference-image colors, in the case of calculating a source profile, and additionally from the destination profile of the imaging apparatus in the case of calculating a device link. The representative colorant combination at a selected spatial location is calculated from the spatial distribution of digital-image colorant combinations in the digital image relative to the selected spatial location.

The reference-image colors are obtained at the selected spatial locations in the reference image through the use of a color-measurement device, including but not limited to, a color scanner, a digital camera, a spectrophotometer and a calorimeter.

A correlation has to be made between the location of the selected spatial locations in the digital image and the corresponding spatial locations on the customer-provided reference image at which measurements are made. This may be achieved in various ways by the use of a "reference-image alignment system." One simple way to achieve this end is to display the digital image on a display device and to highlight, for each selected spatial location, the selected spatial location on the display device and require an operator to measure the color at the corresponding spatial location on the customer-provided reference image.

Another way to achieve the same end, more appropriate to an automated color-measurement apparatus, is to similarly display the digital image on a display screen, indicate at least two points on that image, and then require the operator of the reference-image alignment system to position the sight of the reference-image alignment system at those at least two positions over the reference image. The physical positions are then recorded by the control software of the reference-image alignment system. This data is sufficient to determine the corresponding spatial locations in the reference image for each selected spatial location in the digital image.

Yet another way to achieve the same end, more appropriate to a fully automated apparatus, is to have a digital camera mounted over the mounting surface of the color-measurement apparatus, and to mount the customer-provided reference image on the mounting surface. The reference image can then be digitally photographed. The spatial correlation between the two images is then determined via image analysis.

In this first embodiment of the present invention, the representative colorant combination and the selection of selected spatial locations are based on the weighted distribution of colorant combinations in the vicinity of a given spatial location. The area that a commercial spectrophotometer typically measures is approximately circular and has a diameter of the order of 4 mm. When a color-measurement device, such as a spectrophotometer, measures the color at a given spatial location, the contribution of the light from different points around that location is different, and typically reduces with distance away from the given location. The result of the measurement is effectively a weighted integration of these different contributions. The weighting of the integration is specific to the measurement device employed. The weighting employed in the calculation of the representative colorant combination is selected to emulate this integrative weighting of locations by the color-measurement device. By way of example, for one particular commercial color-measurement device it has been determined that the weighting of locations at a distance r, in millimeters, from the given location is approximately proportional to $(1.8^2-r^2)$ for $r<1.8$, and vanishes for $r\geq 1.8$. This allows a weighting to be calculated for each pixel in the neighborhood of a selected spatial location, the weights being normalized to sum to one. The term "weighted colorant distribution" is used to describe this weighted distribution of digital-image colorant combinations in the space of colorant combinations of the digital image. The weighted colorant distribution is different for each spatial location. In this embodiment of the present invention, the weighted colorant distribution, as well as certain statistics of the weighted colorant distribution described below, are computed over a dense set of spatial locations in the digital image. The dense set can be any one of, but is not limited to, a rectangular grid, a triangular grid, a hexagonal grid, or any other regular pattern. By way of example, if the digital image were a raster image, the weighted colorant distribution and associated statistics could be computed at every nth pixel, where n is an integer. If the image were a vector image, then, in this embodiment of the present invention, it is rasterized at a suitably fine resolution and the weighted colorant distribution and associated statistics are computed over the resulting raster points.

In this first embodiment of the present invention, the digital-image colorant combinations in the vicinity of a selected spatial location are comparatively close in colorant space and the representative colorant combination at the spatial location is the mean of the weighted colorant distribution at that spatial location.

In this first embodiment of the present invention, the selection of the selected spatial locations is based on the covariance matrices of these weighted colorant distributions, and, more specifically, on the maximum eigenvalues of these covariance matrices. The maximum eigenvalue of the covariance matrix of a weighted set of points is essentially the maximum weighted variance over all directions through the set of points. That is, the maximum eigenvalue is a measure of the spread in the direction of maximum spread. The set of maximum eigenvalues for all spatial locations in the digital image is sorted from lowest to highest maximum eigenvalue. The set of selected spatial locations is initialized to contain that single location that is associated with the lowest maximum eigenvalue. For the next lowest maximum eigenvalue of those maximum eigenvalues not already considered, if the representative colorant combination associated with that eigenvalue differs from the representative colorant combinations of all previously selected spatial locations by more than a first predetermined threshold, then the spatial location associated with this next lowest maximum eigenvalue is added to the set of selected spatial locations. This process is repeated until the next lowest maximum eigenvalue of those maximum eigenvalues not already considered is higher than a second predetermined threshold. This ensures that the set of selected spatial locations is comprised of spatial locations near which the variation among the digital-image colorant combinations is low. In this way, for each selected spatial location, the measured color at the corresponding spatial location in the customer-provided reference image can reasonably be associated with the representative colorant combination at the selected spatial location.

In a further embodiment of the present invention, if there is more than one spatial location with closely similar representative colorant combinations, with maximum eigenvalues of the covariance matrices below the threshold, and with the distance between some of those spatial locations greater than some predetermined threshold, such as the diameter of the aperture, then a plurality of such spatial locations may be selected and the representative colorant combinations and color measurements of these locations averaged in some way to minimize measurement error. In one embodiment of the present invention, if there are only two such spatial locations, then both are selected provided that the distance between the spatial locations is greater than the predetermined threshold, or the one with lower maximum value of the maximum eigenvalue otherwise. If there are three or more such spatial locations, then the vertices of the convex hull of those spatial locations are determined. If at least one triple of such vertices has the property that the distance between each pair of that triple exceeds the predetermined threshold, then those vertices are selected so as to maximize the perimeter of the triangle formed by the three vertices. Otherwise, if at least two of the vertices are separated by a distance exceeding the predetermined threshold, then those two points that are most distant from each other are selected. If no two vertices are separated by a distance exceeding the predetermined threshold, then that spatial location with the lowest maximum eigenvalue of the covariance is selected.

In a further embodiment of the present invention, the method takes cognizance of the fact that some areas on the customer-provided reference image contain a small plurality n of groups of digital-image colorant combinations within the area that is measurable by the color-measurement device, such that within each group the digital-image colorant combinations are similar, while the digital-image colorant combinations substantially differ from group to group. For example, it is common that an area on the image, whether it is the digital image or the customer-provided reference image, consists of a background color and some text. In a simple case, the background and text would each be represented by a single digital-image colorant combination. In a more complex case, white text may be positioned over an image of sky, with the color of the sky varying slightly in specific blue tone from location to location. The spectrophotometer, however, due to its measurement field, will produce one single color at each spatial location, based on its measurement of the whole field. In such a case, n spatial locations having n groups of distinct digital-image colorant combinations are identified, and the corresponding spatial locations on the customer-provided reference image are measured. The locations are selected such that the relative proportions of each of the distinct digital-image colorant combinations at the n locations are mathematically linearly independent vectors. The reference-image colors that are associated with the digital-image colorant combinations are then determined by solving the associated n equations.

In one embodiment of the present invention, applicable only in the case where a device link is being created, the output-image color association step of the method of the present invention includes determining for each measured reference-image color a suitable imaging-apparatus colorant combination that will produce the reference-image color when that suitable imaging-apparatus colorant combination is rendered by the imaging apparatus. A variety of methods for doing this is described in the prior art. For example, if the destination profile of the imaging apparatus is encapsulated as an industry standard ICC profile, and the ICC profile contains a color-to-ink (BToA) lookup table, the table can be used simply to interpolate an imaging-apparatus colorant combination for any given measured reference-image color. In a further example, this may be achieved by solving for an imaging-apparatus colorant combination that minimizes a weighted sum of 1) the squared $\Delta E_{94}$ difference between the color associated via the destination profile with the imaging-apparatus colorant combination and the measured reference-image color and 2) the squared Euclidean distance in imaging-apparatus colorant space between the imaging-apparatus colorant combination and a simple transformation of the representative colorant combination into the imaging-apparatus colorant space. Minimizing the $\Delta E_{94}$ difference ensures the desired color match while minimizing the Euclidean colorant combination distance seeks to preserve the original balance of the color separation, such as that, at least approximately, black is retained as black (K), rather than being converted to a combination of cyan (C), magenta (M) and yellow (Y). This latter method applies, of course, only if the imaging-apparatus colorants are the approximately the same as the reference image colorants (e.g. CMYK).

In the case of the creation of a device link, the previous two steps, in combination, establish an association between the selected digital-image colorant combinations and the imaging-apparatus colorant combinations. That is, put differently, the transformation of the device link has been established specifically at those selected digital-image colorant combinations.

The extension step of the method of the present invention includes extending the association of representative colorant combinations with reference-image colors in the case of calculating a source profile, or the association of digital-image colorant combinations with imaging-apparatus colorant combinations in the case of a device link, to all digital-image colorant combinations using a suitable mathematical interpolation method. It is to be noted that the extension step of the present invention must produce an output that is compatible with the input requirements of the color management system employed and, in particular, using the mathematical form inherent to said input requirements.

If the color management system were to expect a multivariate polynomial as input mathematical form, then the objective of the extension step of the present invention would be to determine the coefficients of such a polynomial. The polynomial may be determined, for example, via a least-squares fit of the reference-image colors to the representative colorant combinations, in the case of calculating a source profile, or of the imaging-apparatus colorant combinations to the representative colorant combinations in the case of calculating a device link.

If the color management system uses an ICC-format profile together with tetrahedral interpolation, such as the Prinergy workflow product from Eastman Kodak Company, Rochester, N.Y., then, in the most simple case, the mathematical form required is a multi-way table associating specific digital-image colorant combinations with reference image colors (in the case of a source profile) or with imaging-apparatus colorant combinations (in the case of a device link), with tetrahedral interpolation used to determine reference image colors (in the case of a source profile) or imaging-apparatus colorant combinations (in the case of a device link), for all other digital-image colorant combinations. Note that an ICC-format profile allows, in the more general case, for one-dimensional transformations of the digital-image colorant combinations independently from one another and the reference-image colors (in the case of a source profile), or imaging-apparatus colorant combinations (in the case of a device link), independently from one another. This is the most common mathematical representation used for color management, and, in the present specification, the extension step of the present invention is described in terms of such an arrangement, and entails populating such a multi-way table such that, when the representative colorant combinations are interpolated via this table, the result will be as close as possible to the associated reference-image colors (in the case of a source profile) or imaging-apparatus colorant combinations (in the case of a device link) determined in the output-image color association step of the present invention.

By way of example, in the case of a device link, if the multi-way table utilized N points per axis (N being an integer and N=17 being common in industry), and there were M digital image colorants (M=4 for CMYK), then, for each of the $N^M$ input digital-image colorant combinations of the table, an associated image-apparatus colorant combination has to be determined. In the case of a source profile, the same holds, except that M would denote the number of color components (M=3 for L*a*b*), and for each of the $N^M$ input digital-image colorant combinations of the table, a "reference-image color" has to be determined.

The term "node input colorant combination" is used here to describe any one of the $N^M$ digital-image colorant combinations. The term "output value" is used to describe either the reference-image color, in the case of calculating a source profile, or the imaging-apparatus colorant combination, in the case of calculating a device link.

As an aid to describing an embodiment of the extension step of the present invention, note that any point in n-dimensional Euclidian space can be represented uniquely as the weighted sum of n+1 non-coplanar points, such as, for example, the vertices of a non-degenerate simplex, where the weights themselves sum to one. The point is in the simplex if and only if the weights are all non-negative.

In a first embodiment of the extension step of the present invention the multi-way table entries are obtained by (1) calculating a Delaunay tessellation for the representative colorant combinations, (2) determining for each node input colorant combination the tessellation simplex that contains that node input colorant combination and the associated vertex weights and (3) computing the weighted average of the output values at the vertices.

In a second embodiment of the present invention the multi-way table entries are obtained as follows: As in the first embodiment of the extension step of the invention, the step begins by calculating a Delaunay tessellation for the representative colorant combinations. Then, for each node input colorant combination, the node output value is obtained as a weighted sum of output values, with one output value calculated for each simplex in the tessellation. More specifically, for each simplex the given node input colorant combination is expressed, uniquely, as a weighted sum of the vertices of the simplex. The output value associated with that simplex (for the given node input colorant combination) is the corresponding weighted sum of the output values of the vertices. That is, each simplex provides a linear approximation to the relationship between digital-image colorant combinations and output values, and the output value associated with the simplex (for the given node input colorant combination) is the value of that linear approximation at the given node input colorant combination.

Clearly the linear approximation of the output value for a simplex near the given node input colorant combination would generally be more accurate than that for a simplex far from the given node input colorant combination, so the embodiment determines a weight associated with a simplex that is lower for simplices far from the given node input colorant combination than for simplices that are close. More specifically the weight is based on an estimate (described below) of the error of the linear approximation of the output value at the given node input colorant combination for the case where the underlying relationship is quadratic. The weight accorded to each estimate should decrease as the error estimate increases. Furthermore, because the error estimate increases with the distance, in colorant space, of a simplex from the node input colorant combination, and the number of such simplices increases with the same distance (proportional to the (M−1) power of this distance if the simplices were uniformly distributed in colorant space), the weights must be chosen to decrease fast enough as a function of the error estimate such that the sum of the weights of the estimates from all simplices at a given distance in colorant space will decrease. In one embodiment of the present invention, the weight is chosen to be proportional to the −K power of the estimated absolute error of the linear approximation, where, to satisfy the necessary rate of decrease in the preceding statement, K>(M−1)/2, M being the number of digital-image colorants. In another embodiment of the present invention, K=(M+3)/2, where, as above, M is the number of digital-image colorants. In the case where the point of interpolation is a representative colorant combination, the associated imaging-apparatus colorant combination is used. In effect, the error is zero and the weight is infinite for such a point.

The determination of the error of the linear approximation is obtained as follows. Firstly, it is noted that any quadratic function q(x) that takes value $y_i$ at vertex $x_i$ may be expressed in the form:

$$q(x) = \Sigma w_i(x) y_i + \Sigma_{i>j} \tfrac{1}{2}(d_{ij}+d_{ji}) w_i(x) w_j(x) |x_i - x_j|$$

where $w_i(x)$ is the weight associated with vertex $x_i$ for the given input x, $d_{ij}$ is the directional derivative of q(x) at $x_i$ in the direction of $x_j$, $|x_i - x_j|$ is the Euclidean distance between vertices $x_i$ and $x_j$.

The first term of this expression is the linear approximation used above and the second term approximates the error if the true function were approximately quadratic. In this second embodiment of the extension step of the present invention, the following approximation is made. In the absence of any information about any $d_{ij}$, they are all assumed equal, so that the absolute error is proportional to $$\Sigma_{i>j} |w_i(x) w_j(x)| |x_i - x_j|$$

where $|w_i(x) w_j(x)|$ is the absolute value of the product $w_i(x) w_j(x)$. The values of $d_{ij}$ may alternatively be estimated from the vertices together with other neighboring representative colorant combinations.

In a third embodiment of the extension step of the present invention, the second embodiment of the extension step of the invention is applied only to those nodes that are used in the tetrahedral interpolation of the representative colorant combinations. The node output values at each node used in the tetrahedral interpolation of the representative colorant combinations are then adjusted such that the interpolation correctly reproduces the associated output values. While this adjustment could be performed in various different ways known to those skilled in the art, in this preferred embodiment a multiple G of the sum of the squares of the deviations of the interpolated node output values from the associated output values, plus the sum of the squares of the deviations of the adjusted node output values from the initial output values is minimized. In this embodiment of the present invention, G is taken to be approximately 100. Finally, for all nodes in the multi-way table, other than the tetrahedral interpolation nodes, the entries are obtained by (1) calculating a Delaunay tessellation for the tetrahedral interpolation nodes, (2) determining for each node input colorant combination, other than the tetrahedral interpolation nodes, the tessellation simplex that contains that node input colorant combination and the associated vertex weights, and (3) computing the weighted average of the node output values at the vertices.

In the encapsulation step of the present invention, the transformation is encoded as a source profile or as a device link in the format required by the color management system, as discussed above.

Figure 2:
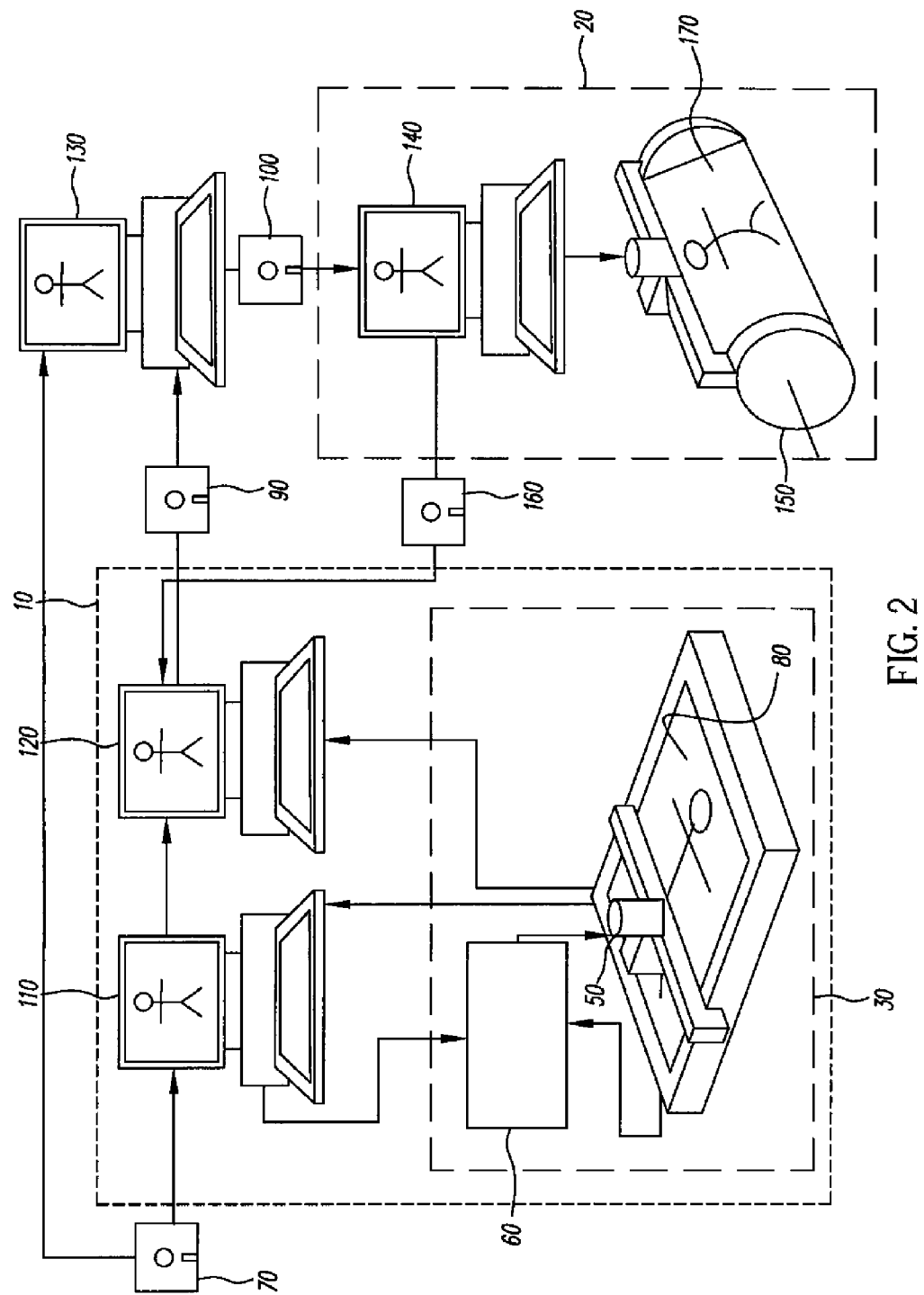
FIG. 2 is a schematic drawing of a device link according to the present invention.

Referring to FIG. 2, in one aspect of the method of the present invention, the method is embodied in a device-link generating apparatus 10 for executing the method of the present invention. Device-link generating apparatus 10 includes a measurement-location selector 110, a device-link transform generator 120 and a color-measurement apparatus 30, color-measurement apparatus 30 includes a color-measurement device 50 and a reference-image alignment system 60. Measurement-location selector 110 is configured to analyze digital image 70, using the relative weighting of color from all points near a location where a color is measured by color-measurement device 50, and send the coordinates of selected spatial locations in the digital image to reference-image alignment system 60, and to send information about the digital-image colorant combinations in the vicinity of the measurement locations to device-link transform generator 120. Reference-image alignment system 60 is configured to align a digital image 70 provided to measurement-location selector 110 and a reference image 80 residing on color-measurement apparatus 30 to each other and color-measurement device 50 is configured to measure colors at selected spatial locations in reference image 80. Device-link transform generator 120 is configured to use the information about the digital-image colorant combinations, the measured colors, and a destination profile 160 provided by imaging controller 140 of imaging apparatus 20 to produce a device link 90. Device-link generating apparatus 10 may be configured to send the device link 90 of the present invention to color management system 130. Color management system 130 is configured to convert the digital image 70 to a modified digital image 100, modified digital image 100 being represented using imaging-apparatus colorant combinations. Imaging controller 140 of imaging apparatus 20 is thereby configured to render, on imaging device 150, digital image 70, via modified digital image 100, as an output image 170 having output-image colors matching reference-image colors at corresponding physical locations in the reference image 80.

Figure 3:
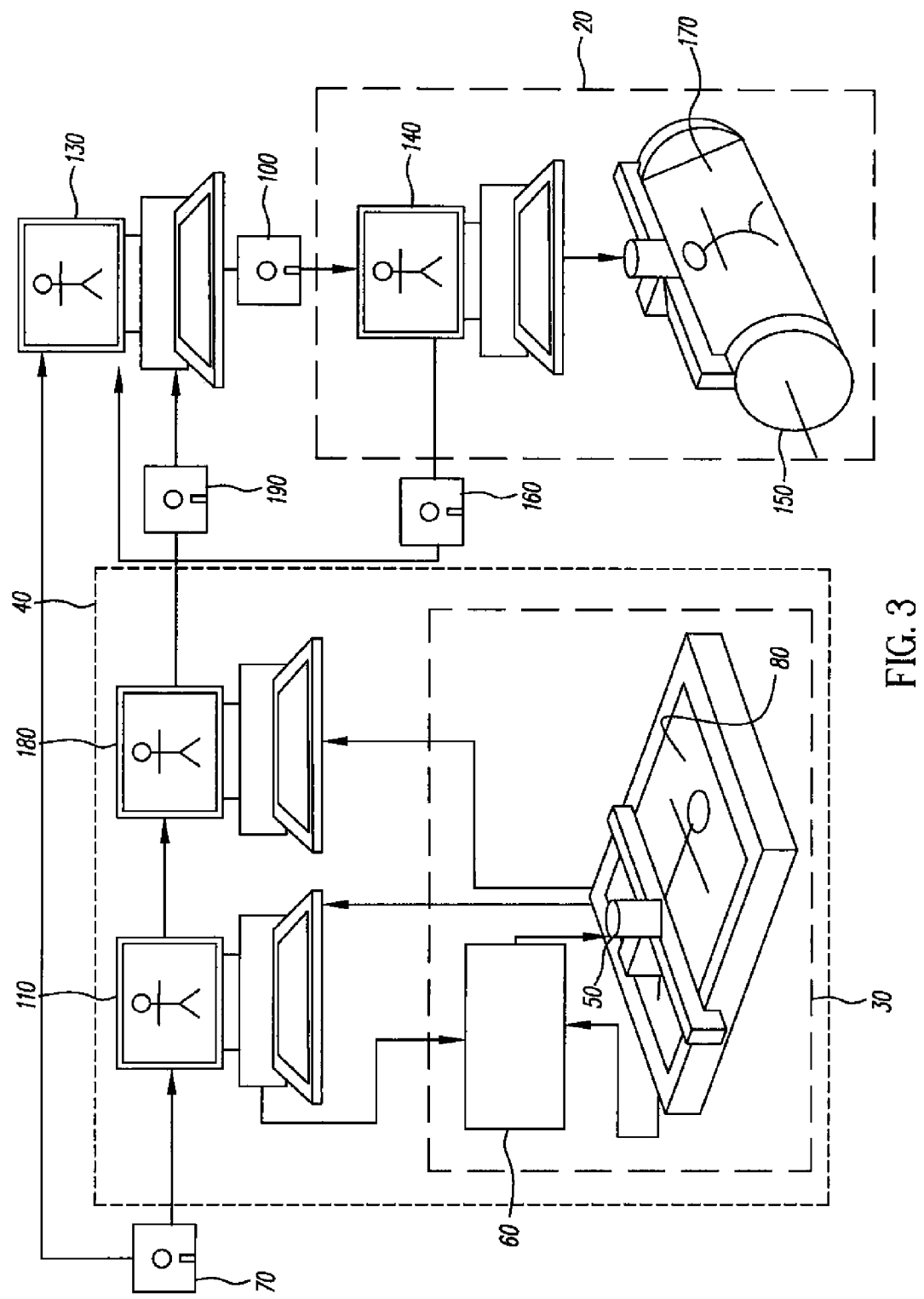
FIG. 3 is a schematic drawing of a device link according to the present invention.

Referring to FIG. 3, in one aspect of the method of the present invention, the method is embodied in a source-profile generating apparatus 40 for executing the method of the present invention. The source-profile generating apparatus 40 includes a measurement-location selector 110, a source-profile transform generator 180 and a color-measurement apparatus 30 including a color-measurement device 50 and a reference-image alignment system 60. Measurement-location selector 110 is configured to analyze digital image 70, using the relative weighting of color from all points near a location where a color is measured by color-measurement device 50, and send the coordinates of selected spatial locations in the digital image to reference-image alignment system 60, and to send information about the digital-image colorant combinations in the vicinity of the measurement locations to source-profile transform generator 180. Reference-image alignment system 60 is configured to align a digital image 70 provided to measurement-location selector 110 and a reference image 80 residing on color-measurement apparatus 30 to each other and color-measurement device 50 is configured to measure colors at selected spatial locations in reference image 80. Source-profile transform generator 180 is configured to use the information about the digital-image colorant combinations and the measured colors to produce a source profile 190. Source-profile transform generator 180 may be configured to send the source profile 190 of the present invention to color management system 130. Color management system 130 is configured to use source profile 190 and a destination profile 160 provided by imaging controller 140 of imaging apparatus 20 to convert the digital image 70 to a modified digital image 100, modified digital image 100 being represented using imaging-apparatus colorant combinations pertaining to imaging apparatus 20. Imaging controller 140 of imaging apparatus 20 is thereby configured to render, on imaging device 150, digital image 70, via modified digital image 100, as an output image 170 having output-image colors matching reference-image colors at corresponding physical locations in the reference image 80.

The invention has been described in detail with particular reference to certain preferred embodiments thereof, but it will be understood that variations and modifications can be effected within the scope of the invention.

PARTS LIST 10 device-link generating apparatus
11 reference-image color association step
12 decision point
13 output-image color association step
14 calculation of device link
15 transformation is encoded and encapsulated as a device link
16 calculation of source profile
17 transformation is encoded and encapsulated as a source profile
20 imaging apparatus
30 color-measurement apparatus
40 source-profile generating apparatus
50 color-measurement device
60 reference-image alignment system
70 digital image
80 reference image
90 device link
100 modified digital image
110 measurement-location selector
120 device-link transform generator
130 color management system
140 imaging controller
150 imaging device
160 destination profile
170 output image
180 source-profile transform generator
190 source profile

The invention claimed is:

1. A method for making a device link, the method comprising:
   (a) selecting one or more selected spatial locations in a digital image;
   (b) calculating for each of the one or more selected spatial locations a representative colorant combination;
   (c) obtaining reference-image colors at corresponding selected spatial locations in a reference image; and
   (d) deriving the device link from the representative colorant combinations, the corresponding reference-image colors, and a destination profile of an imaging apparatus.

2. The method of claim 1, wherein the calculating is based on the selected spatial location and on a spatial distribution of digital-image colorant combinations in the digital image.

3. The method of claim 2, wherein the representative colorant combination is a weighted average of the spatial distribution of digital-image colorant combinations in a vicinity of the selected spatial location.

4. The method of claim 1, wherein the obtaining comprises at least one of
   (a) scanning with a scanner;
   (b) photographing with a digital camera;
   (c) measuring with a spectrophotometer; and
   (d) measuring with a colorimeter.

5. A method for modifying a digital image, the modifying comprising:

(a) selecting one or more selected spatial locations in the digital image;
(b) calculating for each of the one or more selected spatial locations a representative colorant combination;
(c) obtaining reference-image colors at the corresponding selected spatial locations in a reference image;
(d) deriving a device link from the representative colorant combinations and the corresponding reference-image colors; and
(e) applying the device link to the digital image.

6. The method of claim 5, wherein the calculating is based on the selected spatial locations and on the spatial distributions of digital-image colorant combinations in the digital image in a vicinity of the selected spatial locations.

7. The method of claim 6, wherein the representative colorant combination is a weighted average of the spatial distribution of digital-image colorant combinations in the digital image in the vicinity of the selected spatial location.

8. The method of claim 5, wherein the obtaining comprises at least one of:
(a) scanning with a scanner;
(b) photographing with a digital camera;
(c) measuring with a spectrophotometer; and
(d) measuring with a colorimeter.

9. A method for making a source profile, the method comprising:
(a) selecting one or more selected spatial locations in a digital image;
(b) calculating for each of the one or more selected spatial locations a representative colorant combination;
(c) obtaining reference-image colors at corresponding selected spatial locations in a reference image; and
(d) deriving the source profile from the representative colorant combinations and the corresponding reference-image colors.

10. The method of claim 9, wherein the calculating is based on the selected spatial locations and on the spatial distribution of digital-image colorant combinations in the digital image in a vicinity of the selected spatial locations.

11. The method of claim 10, wherein the representative colorant combination is a weighted average of the spatial distribution of digital-image colorant combinations in the digital image in a vicinity of the selected spatial location.

12. The method of claim 9, wherein the obtaining comprises at least one of
(a) scanning with a scanner;
(b) photographing with a digital camera;
(c) measuring with a spectrophotometer; and
(d) measuring with a colorimeter.

13. A method for modifying a digital image, the modifying comprising:
(a) selecting one or more selected spatial locations in the digital image;
(b) calculating for each of the one or more selected spatial locations a representative colorant combination;
(c) obtaining reference-image colors at the corresponding selected spatial locations in a reference image;
(d) deriving a source-profile from the representative colorant combinations and the corresponding reference-image colors; and
(e) applying the source-profile to the digital image using a destination profile for an imaging apparatus.

14. The method of claim 13, wherein the calculating is based on the selected spatial locations and on the spatial distribution of digital-image colorant combinations in the digital image in a vicinity of the selected spatial locations.

15. The method of claim 14, wherein the representative colorant combination is a weighted average of the spatial distribution of digital-image colorant combinations in the digital image in the vicinity of the selected spatial location.

16. The method of claim 13, wherein the obtaining comprises at least one of:
(a) scanning with a scanner;
(b) photographing with a digital camera;
(c) measuring with a spectrophotometer; and
(d) measuring with a colorimeter.

* * * * *